May 29, 1928.
H. C. DOANE
1,671,927
INSTRUMENT BOARD ILLUMINATION
Filed Oct. 10, 1927          2 Sheets-Sheet 1
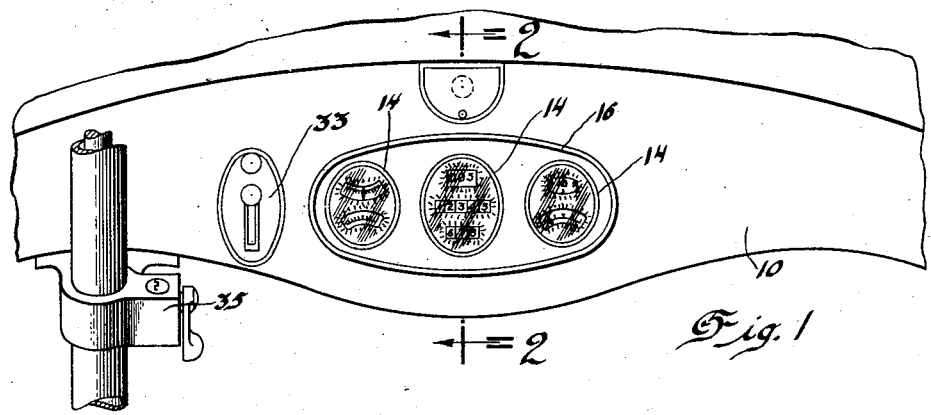
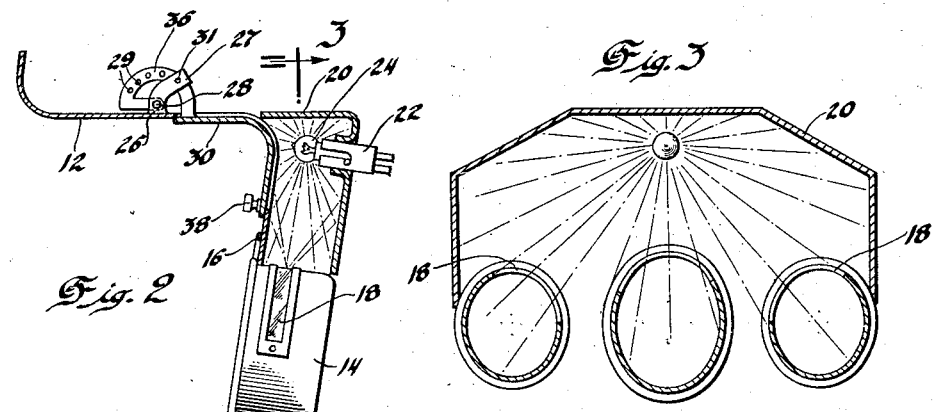
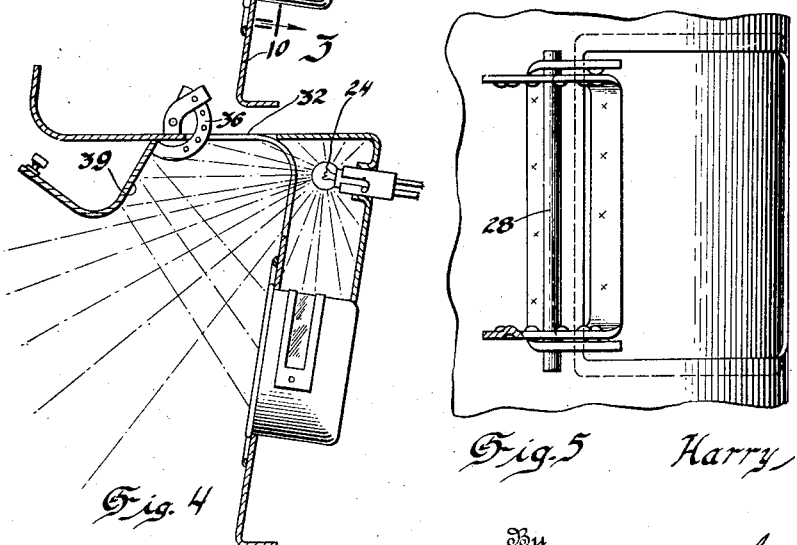
Inventor
Harry C. Doane
By Blackmore, Spencer & Flint
Attorneys

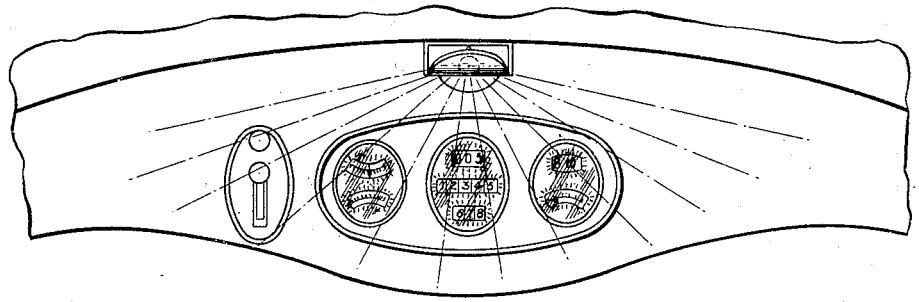
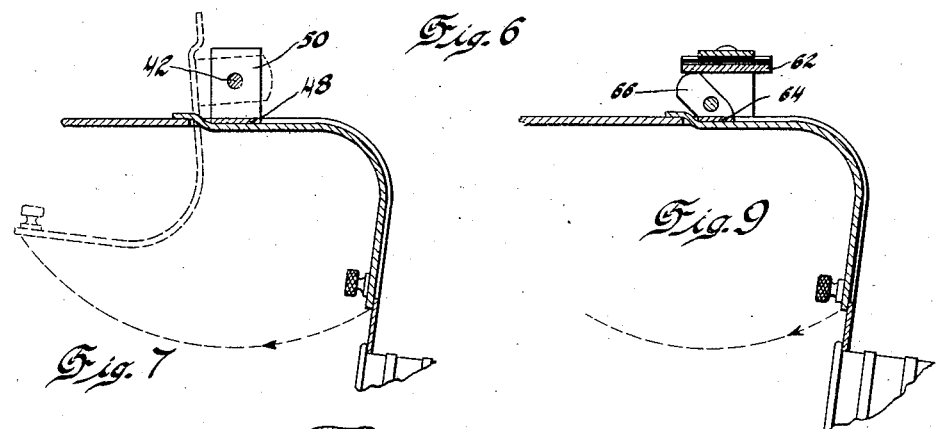
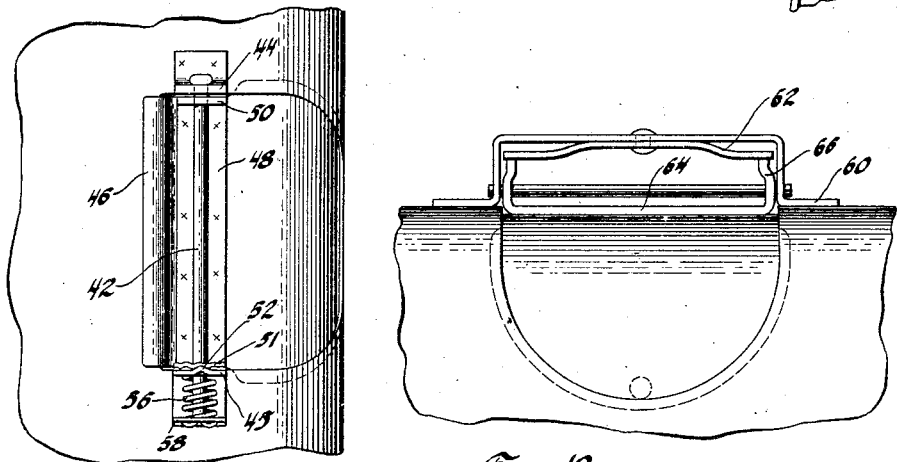

Patented May 29, 1928.

1,671,927

UNITED STATES PATENT OFFICE.

HARRY C. DOANE, OF FLINT, MICHIGAN, ASSIGNOR TO GENERAL MOTORS CORPORATION, OF DETROIT, MICHIGAN, A CORPORATION OF DELAWARE.

INSTRUMENT-BOARD ILLUMINATION.

Application filed October 10, 1927. Serial No. 225,235.

This invention relates to an instrument mounting and lighting means, and is particularly adapted for use with an automotive vehicle.

It is an object of the invention to provide a new and improved instrument lighting means which will provide more adequate illumination for the instruments mounted on an instrument board, and will more effectively utilize the light provided for that purpose than has hitherto been accomplished. More specifically it is an object of the invention to provide a set of instruments lighted by both external and internal illumination. It is a further object of the invention to provide a lighting arrangement by means of which a single light bulb provides both internal and external illumination for the instruments and in addition provides light for the floor board, locking and other mechanism and also provides a light which may be used for reading.

Other objects and advantages of the invention will appear in the course of the following description, taken in connection with the accompanying drawings and appended claims.

In the drawing:

Figure 1 is a front view of the dashboard of an automotive vehicle embodying my invention.

Figure 2 is a side view partly in section on the line 2—2 of Figure 1.

Figure 3 is a section on the line 3—3 of Figure 2.

Figure 4 is a view similar to Figure 2 but showing the reflecting cover open.

Figure 5 is an enlarged plan view of part of the structure shown on Figure 4.

Figure 6 is a view similar to Figure 1 with the reflecting cover open.

Figure 7 is a sectional view of a modified form of my invention.

Figure 8 is a plan view of the structure shown in Fig. 7.

Figure 9 is a sectional view of another modified form of my invention.

Figure 10 is a rear view of the structure shown in Fig. 9.

In the description which follows, the terms "forward" and "rearward" apply to the position of the car and the operator. Referring to the drawings, I have illustrated a portion of the dashboard of an automotive vehicle which comprises a comparatively thin supporting strip 10, formed with a rearwardly and upwardly extending portion 12. Mounted on the forward side of the supporting strip and facing rearwardly are the instruments 14, which may be of any usual character such as a speedometer, oil gauge, etc., and which are fixed to the dashboard in any usual or desired manner. Surrounding the instruments is the ornamental bezel 16. While I have shown the instruments mounted directly and separately on the dashboard, it is within the scope of my invention that they be mounted on a separate removable instrument panel mounted as a unit in an aperture in the dashboard as is well known in the art.

Each instrument is provided on its upper side with an arcuate slot 18 which is covered with a strip of transparent material, such as glass or pyraline, thus forming a window. Fixed to the forward side of the dashboard is the polygonal reflecting casing 20 which opens downward toward the instruments. The window in each instrument is on the side toward the light bulb. Fixed in an aperture in the rear side of said casing is the socket 22 of the light bulb 24 which is mounted in the socket by means of the usual pin and slot connection. The structure just described is provided for internally illuminating the instruments and indirectly lighting their faces or dials, the construction of the instruments being such that the light entering through the windows lights up the dials as is well-known in the art.

On the inner or upper side of the horizontal portion 12 of the dashboard are supported a bracket 26 provided with upstanding ears 27 supporting a shaft 28 on which is pivoted the door 30, which is curved to fit snugly over an aperture 32 provided in the bend in the dashboard. The door is connected to the shaft by means of arcuate arms 36 which contact with the respective brackets 26 and serve to frictionally hold the door in any adjusted position. While a frictional contact may be sufficient I prefer to provide the arms 36 with small bubbles or depressions 29 which cooperate with a similar bubble or bump 31 on the arm 36. As the arms 36 are of material which will spring slightly, the construction described insures that the door will be held firmly in any adjusted position. A button or knob 38 is provided on the rear side of the door. The front face of the door is provided with a light reflecting surface, as indicated at 39, for reflecting the light from the bulb 24 down on the faces of the instruments for direct lighting thereof and also to the control 33 for the heater, the lock 35 or other mechanism mounted adjacent thereto. The door also prevents the direct rays from the light bulb from striking the operator's eyes. This construction provides a light by which the operator is enabled to read his maps or other material, and also makes possible the ready removal and replacement of the bulb.

In Figures 7 and 8, I have shown a modified form of my invention. In this embodiment the shaft 42 is supported in brackets 44 fixed to the upper side of the horizontal portion of the dashboard. Extending across the upper side of the door 46 is a U-shaped member 48, the upwardly bent portions or ears 50 and 51 of which are provided with apertures for supporting the door on the shaft 42. The ear 51 is provided with corrugations extending radially from the axis of shaft 42 for cooperating with a bent out portion or lug 52 on the bracket 44 for holding the door in any position to which it may be adjusted. In this connection it may be noted that the bracket 45 is lighter than the bracket 44 and is of spring material. A coil spring 56 surrounding the shaft 42 between the ear 44 and washer 58 serves to constantly urge the spring bracket 45 against the corrugated ear 51.

In Figures 9 and 10, I have illustrated still another modified form of my invention in which a U-shaped bracket 60 is fixed over the aperture in the dashboard, and is provided with a spring 62 fixed within the bight of the bracket. A U-shaped member 64 is fixed to the upper side of the door and is provided with ears 66 extending upward and contacting with the underside of the spring 62. The ears 66 are polygonal on their spring contacting surface as illustrated in that the door may be held in a plurality of adjusted positions.

I claim:

1. In an instrument assembly, an instrument board having instruments mounted thereon and provided with windows, a light bulb mounted in rear of said instrument board for indirectly lighting the dials of said instruments, and means for reflecting light from said bulb to the faces of said instruments comprising a pivoted door in said instrument board adjacent said light bulb and provided with a light reflecting surface.

2. In an instrument assembly, an instrument board having instruments fixed to the rear side thereof and provided with windows, a light bulb mounted adjacent thereto for indirectly lighting said instruments, said instrument board being provided with an aperture adjacent said light bulb and with a forwardly extending portion, and a reflecting element hinged to said forwardly extending portion and provided with a light reflecting surface for directly illuminating said instruments.

3. The combination of an instrument board, an instrument mounted thereon, a source of light at the rear of the instrument board for indirectly illuminating the instrument, said board being apertured in front of said source, and a pivoted cover for said aperture adapted to provide direct illumination.

4. The combination of an instrument board, an instrument provided with indicating means mounted on the board, said instrument having a casing provided with an aperture for the display of the indicating means and with an aperture for the projection of light upon the indicating means, a source of light at the rear of the board adapted to project light through said second-named aperture, an aperture in the instrument board in front of said light source, a cover for said aperture pivoted to swing in a vertical plane and adapted to be swung away from the board to give direct illumination, and means for holding the cover in open position.

5. The combination of an instrument board having an overhanging portion, an instrument mounted on the board, a source of light at the rear of the board for indirectly illuminating the instrument, said board being provided with an aperture in front of said light source, and an L-shaped cover hinged to the overhanging portion of the panel and normally snugly fitting within the angle thereof, said cover being provided with a reflecting surface on its rear face and being arranged to be swung upwardly to provide direct illumination.

6. In the combination as defined in claim 5, the rear face of the normally horizontally extending portion of the L-shaped cover being provided with a reflecting surface for directing light upon the faces of the instruments when the cover is swung to open position, and means for holding said cover in such position.

In testimony whereof I affix my signature.

HARRY C. DOANE.